(12) United States Patent
Khusravsho et al.

(10) Patent No.: US 10,272,787 B2
(45) Date of Patent: Apr. 30, 2019

(54) ELECTRIC VEHICLE

(71) Applicant: ShenZhen Deep Space Intelligence Technology Co., LTD, Shenzhen (CN)

(72) Inventors: Rahmatulloev Khusravsho, Shenzhen (CN); David I Henderson, Shenzhen (CN)

( * ) Notice: Subject to any disclaimer, the term of this patent is extended or adjusted under 35 U.S.C. 154(b) by 116 days.

(21) Appl. No.: 15/413,439

(22) Filed: Jan. 24, 2017

(65) Prior Publication Data

US 2017/0217317 A1 Aug. 3, 2017

(30) Foreign Application Priority Data

Feb. 1, 2016 (GB) .................................. 1601769.1

(51) Int. Cl.
| | |
|---|---|
| *B60K 1/04* | (2019.01) |
| *H02K 7/02* | (2006.01) |
| *B60L 7/12* | (2006.01) |
| *B60L 11/16* | (2006.01) |
| *B60L 11/18* | (2006.01) |
| *B60K 1/00* | (2006.01) |
| *H02K 7/00* | (2006.01) |

(52) U.S. Cl.
CPC ................ *B60L 11/16* (2013.01); *B60K 1/00* (2013.01); *B60K 1/04* (2013.01); *B60L 7/12* (2013.01); *B60L 11/1818* (2013.01); *B60L 11/1822* (2013.01); *B60L 11/1877* (2013.01); *B60L 11/1879* (2013.01); *H02K 7/006* (2013.01); *H02K 7/025* (2013.01); *B60K 2001/001* (2013.01); *B60K 2001/0405* (2013.01); *B60K 2001/0416* (2013.01); *B60K 2001/0472* (2013.01); *B60K 2001/0477* (2013.01); *B60L 2220/16* (2013.01); *B60Y 2200/91* (2013.01); *B60Y 2400/162* (2013.01); *Y02E 60/16* (2013.01); *Y02T 10/6204* (2013.01); *Y02T 10/641* (2013.01); *Y02T 10/705* (2013.01); *Y02T 10/7005* (2013.01); *Y02T 10/7027* (2013.01); *Y02T 10/7033* (2013.01); *Y02T 10/7072* (2013.01); *Y02T 10/92* (2013.01); *Y02T 90/124* (2013.01); *Y02T 90/14* (2013.01)

(58) Field of Classification Search
CPC .. B60L 11/16; B60L 11/1818; B60L 11/1822; B60L 11/1877; B60K 1/04; B60K 2001/0405; B60K 2001/0416; B60K 2001/0477; H02K 7/025; B60Y 2200/91
USPC .................................................. 307/9.1, 10.1
See application file for complete search history.

(56) References Cited

U.S. PATENT DOCUMENTS

| | | | |
|---|---|---|---|
| 6,870,277 B2* | 3/2005 | Pavlykivskyj | ......... B60K 6/105 290/1 A |
| 2011/0231041 A1* | 9/2011 | Kim | ....................... B62D 37/06 701/22 |
| 2012/0248868 A1* | 10/2012 | Mobin | .................. B60L 3/0046 307/9.1 |

* cited by examiner

Primary Examiner — Hal Kaplan

(57) ABSTRACT

The invention provides a powertrain for an electric vehicle, and an electric vehicle as such. The powertrain has an electric motor and a drivetrain for transmitting rotary power from the electric motor to at least one of the vehicle wheels. A mechanical rotary transmission is provided in association with a flywheel. The mechanical rotary transmission is controllable to transmit power in a direction from the vehicle wheels to the flywheel and further transmit power in the reverse direction. Power from both the electric motor and the flywheel is concurrently used to accelerate the vehicle. The vehicle kinetic energy is recovered and stored at the flywheel during vehicle deceleration. The motor vehicle has at least one battery unit to supply the electric motor. The battery unit is removable from the vehicle, without tools, and is portable so that it is carried away from the vehicle for charging.

17 Claims, 6 Drawing Sheets

ELECTRIC VEHICLE

FIELD

The present invention is in the field of electric vehicles.

BACKGROUND

At the date of application the great majority of motor cars ("automobiles", in US English) and other steerable, self-propelled land vehicles use an internal combustion engine (hereinafter an "ICE") for their propulsion. Electric vehicles (sometimes referred to herein as "EVs") are commercially available and are currently the subject of intensive research and development since it is widely supposed that they will within the foreseeable future supplant ICE-propelled vehicles, or at least take a greatly increased market share. The concept of a vehicle powered by an electric motor from on-board batteries is as old as the automobile itself. For most of the twentieth century, however, such vehicles struggled in most practical applications to compete with their ICE powered alternatives. But there are at the current point in time numerous incentives, both societal and technological, for greater adoption of EVs. It is hoped that EVs will, in comparison to ICE propelled vehicles, be less polluting, cheaper to run and quieter, among other advantages.

Arguably the biggest factors which have up to now favoured ICEs over electric propulsion systems for motor vehicles relate to battery technology. The term "battery" will be used herein in its conventional sense, to refer to a unit comprising one or more electrical cells to store energy and to supply it in electrical form. It should not be understood to encompass fuel cells, however. When used in EVs, batteries suffer from shortcomings at least in relation to:

(1) Energy density, typically expressed as the ratio of a battery's energy storage capacity to its mass. Volumetric energy density—energy storage capacity per unit volume—is also often referred to. On either measure, battery technologies have traditionally lagged behind ICEs and their fuel tanks. The mass and bulk of batteries that can be accommodated in a vehicle is limited. This—in conjunction with the limited energy density achieved by battery technology—limits the energy storage capacity that can be provided by a vehicle's battery, which in turn limits an EV's range—the distance it can be driven between battery charging sessions. To provide an EV with a range comparable to that of an ICE propelled vehicle typically requires a battery pack that is heavy and bulky—for some purposes prohibitively so. The mass of the battery pack may make up a substantial part of the mass of the vehicle, reducing the vehicle's acceleration and increasing its energy usage.

(2) Convenience of recharging. Refueling a conventional fossil-fuel driven motor car at a petrol station (gas station) is a quick and convenient, if expensive, process for the driver. Recharging an EV can be less convenient. The problem is partly one of time and partly of access to a suitable electrical supply. Due to the time taken to achieve a full charge, many EVs are at the time of writing intended to be charged overnight at the owner's home. Some commercially available vehicles claim to be capable of taking a partial charge in times under an hour. But the time and consequent inconvenience involved in recharging batteries remains an important impediment to uptake of the technology. The problem can be seen to be especially acute for those living in homes without off-street parking. Vehicle owners who have a driveway or garage to which they can lead a charging point connected to the electric mains may have little problem in charging their vehicle overnight. Consider however the problem faced by an urban driver who parks their car on the public street overnight. This individual will not normally be able to lead an electric cable from home to vehicle to carry out overnight charging, and nor will it be convenient for them to drive to a dedicated charging site and wait the considerable time needed for the battery to be recharged. Alternative solutions, such as the installation of chargers on residential streets, raise further problems of availability, cost and regulatory hurdles. In addition, some destinations, such as hotels, may have no charging options whatsoever.

(3) Power density. The rate at which energy can be delivered by a given battery is limited, which potentially limits the acceleration of an EV and its sustainable top speed. Using a battery to deliver power at the upper end of its operating envelope can lead to battery heating, which is inefficient and reduces battery lifetime. In designing batteries there is normally a compromise to be made between energy density and power density, but high values of both are desirable in most EVs.

(4) Cost. Battery technology is an area of intensive research and advances in this field in recent years have ameliorated problems of energy density and power density somewhat. It is now possible to achieve high performance and acceptable vehicle range in an electrically powered motor car, as exemplified by the well-known Tesla® range. These cars still have battery packs with a mass much greater than that of the engine and fuel tank of an equivalent petrol-driven car, but in addition the cost of the battery pack for such a vehicle is at the time of writing several times the cost of an ICE of similar performance, and the battery packs have a finite lifetime, requiring periodic replacement.

SUMMARY OF THE INVENTION

The objective of the present invention is to provide a practical and usable electric vehicle. To do so it uses certain technologies which are in themselves known and which will now be discussed.

To increase the range of an EV it is desirable to improve its overall efficiency. In most ICE propelled motor cars the kinetic energy invested in the vehicle during acceleration is dissipated—and so wasted—when the vehicle decelerates. There are various technologies for recovering and storing a portion of this kinetic energy so that it can subsequently be used to accelerate the vehicle. Such technologies are often referred to as "regenerative braking systems", or as "KERS"—kinetic energy recovery systems.

One known way to achieve this in an electric vehicle or hybrid vehicle is by operating the electric motor as a generator during vehicle deceleration, the electric energy thereby generated being used to charge the battery. In this process the vehicle's kinetic energy is converted first to electrical energy by the motor/generator and then to electrochemical form in the batteries. To be subsequently used, the energy must undergo the same chain of conversions in reverse. Each conversion of energy from one form to another involves an energy loss. Overall efficiency is consequently limited. Also regenerative braking systems of this type help to address problems associated with limited battery energy capacity but—since energy is supplied to the motor from the battery pack alone—do not assist with issues relating to battery power capacity.

Other means can be used to store the recovered electrical energy from a vehicle's motor generator. For a review of energy storage devices suitable for use in EVs, refer to Energy Storage for Electric Vehicles, Juan Dixon, IEEE. Suitable devices include high capacity capacitors ("supercapacitors") and hydraulic accumulators. In a hydraulic KERS, pressure in some form of accumulator is raised during vehicle deceleration and the accumulator is exhausted through some form of hydraulic motor to subsequently accelerate the vehicle. Neither of these technologies has achieved widespread take up in the automobile sector and practical obstacles remain to their adoption.

Another way to store recovered kinetic energy is to use it to drive a flywheel. The kinetic energy thus invested in the flywheel can subsequently be used to drive the vehicle. Flywheels KERS systems will be divided herein between (a) electric flywheel systems and (b) mechanical flywheel systems.

In an electric flywheel system the wheel torque needed to decelerate (brake) a vehicle is provided through a generator. Electric power thereby generated is supplied to a separate electric motor/generator to spin up (accelerate) a flywheel, investing it with kinetic energy. When power is subsequently needed to drive the vehicle, the electric motor/generator is used to convert the flywheel's kinetic energy to electrical energy, which is supplied to a propulsion motor to drive the vehicle. The generator used to brake the vehicle and the propulsion motor used to drive it may be the same unit. Electric flywheel systems have for example been used in motor racing. For examples of such systems refer to:

Control Strategies and Power Electronics in a Low-Cost Electric Vehicle Propulsion System Employing a Brushless DC Machine, Xinxiang Yan, Doctoral Thesis at the School of Engineering, Faculty of Technology, Northern Territory University. This document contains a discussion of "load-leveling" in an EV, using a high power energy storage device to reduce peak power drawn from a battery. It mentions various devices that can be used for this function, among them an electric flywheel system used as "an electromechanical battery". There is no mention of use of a mechanical flywheel system, of the type described below.

Development of a Hybrid Flywheel/Battery Drive System for Electric Vehicle Applications, Lustenader et al, IEEE Transactions on Vehicular Technology, Vol. VT-10 26, May 1977. Here again the electrically driven flywheel is used to recover kinetic energy and to " . . . isolate the battery from the accelerating power peaks".

In other applications—e.g. in motor sports—electric flywheel systems are used to provide brief periods of high power, e.g. for overtaking manoeuvres.

In a mechanical flywheel system a mechanical transmission is provided for transmitting energy between the flywheel and the vehicle's ground-engaging wheel(s). During vehicle acceleration power is drawn from the flywheel through the mechanical transmission to drive the wheels. During deceleration power flows through the transmission in the opposite direction to spin up the flywheel. Mechanical flywheel systems are typically suggested for use in relation to ICE driven vehicles in the literature although searching by the applicant has revealed some references to use of mechanical flywheel systems being used in electric vehicles:

An Advanced Vehicular Flywheel System for the ERDA Electric Powered Passenger Vehicle, Towgood et al, published in 1977 Flywheel Technology Symposium Proceedings by the US Department of Energy, which depicts a system in which a flywheel is provided alongside an electric motor and is arranged to drive the vehicle wheels through what is referred to as a "differential transmission". The document envisages its use in a 4 person passenger vehicle with a kerb weight of up to 2566 pounds (1160 kg). Little detail is given on other aspects of the vehicle.

Design Study of Flat Belt CVT for Electric Vehicles, Emerson L. Kumm, prepared for the National Aeronautics and Space Administration. This describes in some detail a continuously variable transmission ("CVT") for use in a mechanical flywheel system. Use of this system is envisaged in a vehicle of 1700 kg mass.

Additionally a review of literature relating to use of flywheel systems (both electrical and mechanical) in EVs is provided in Review of Battery Electric Vehicle Propulsion Systems incorporating Flywheel Energy Storage, Dhand et al., International Journal of Automotive Technology, June 2015.

A mechanical flywheel system needs some form of mechanical, rotary transmission through which the flywheel is able to drive the vehicle wheels (and vice versa). The direction of power flow and the torques created at the flywheel and the vehicle wheels vary with the speed ratio of this transmission. It is through this transmission that both (a) charging/discharging of the flywheel, and (b) wheel torque provided by the mechanical flywheel system to the vehicle wheels, are controlled. The ratio of the rotational speed of the flywheel to that of the vehicle wheels varies continuously (steplessly) and to accommodate this the transmission in question may be a CVT (continuously variable transmission) incorporating a variator. The variator can be conceptualised as a unit having a rotary input and a rotary output (the designations "input" and "output" being somewhat arbitrary since in many cases power can flow in either direction through the variator) and a mechanism through which rotary drive is transmitted between the input and the output, the rotational speed ratio of the input to that of the output being continuously (steplessly) variable. The mechanism in question can take a variety of forms. Well known examples include (a) the "belt and sheave" or "expanding pulley" variator, in which some form of drive belt runs on a pair of pulleys, the effective diameter of at least one of the pulleys being variable to alter their relative speeds, (b) rolling traction type variators, where a roller runs on some form of race and the distance of the roller from the axis of the race is variable to alter transmission ratio—see for example U.S. Pat. No. 5,395,292 (Fellows), and (c) hydrostatic variators. This list is not exhaustive.

One way to alleviate some of the problems relating to charging of vehicle batteries is to arrange for the battery to be removable so that it can be taken to a charging station separate from the vehicle itself. US2009/0252994, Livingston, discloses a battery pack system offering this facility.

A problem remains in providing an electrically powered wheeled and steerable motor vehicle which meets the practical needs of everyday drivers in terms of one or more of convenience of charging, convenience of urban and suburban use, range, economy and performance.

According to a first aspect of the present invention, there is an electrically powered motor vehicle having multiple vehicle wheels and comprising an electric motor; a drivetrain for transmitting rotary power from the electric motor to at least one of the vehicle wheels; a flywheel; a mechanical rotary transmission which is configured and controllable (a) to transmit power from at least one of the vehicle wheels to the flywheel and (b) to transmit power from the flywheel to at least one of the vehicle wheels, enabling power from the electric motor and the flywheel to be used concurrently to accelerate the vehicle, and enabling vehicle kinetic energy to be recovered and stored at the flywheel during vehicle deceleration; and at least one battery unit which is engageable with the vehicle to supply electric power to the electric motor for vehicle propulsion, the battery unit being removable from the vehicle and being portable so that it is able to be carried away from the vehicle for charging.

BRIEF DESCRIPTION OF THE DRAWINGS

Specific embodiments of the present invention will now be described, by way of example only, with reference to the accompanying drawings, in which:

In FIG. 5b a large battery unit is about to be loaded in the vehicle and in FIG. 5c the battery unit is loaded in the vehicle;

DETAILED DESCRIPTION

Figure 1A:
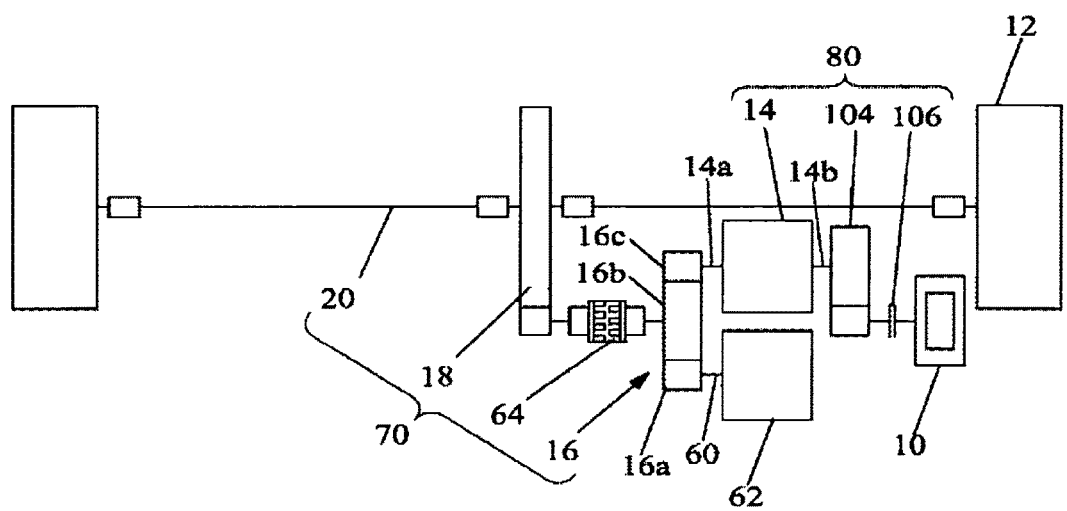
FIGS. 1a and 1b are schematic diagrams of selected components of drivetrains for use in a vehicle embodying the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The specific embodiment to be described herein is a small, lightweight, steerable, two-seater vehicle using an electric motor for propulsion, removable and manually portable batteries for supply of electric power to the motor, and a mechanical flywheel system which recovers energy during vehicle deceleration and which augments the power from the batteries during acceleration. The vehicle may be described as a motor car (automobile) and can have an enclosed cabin, although for certain regulatory purposes it is intended to qualify as a heavy on-road quadricycle.

The vehicle is expected to appeal particularly but not exclusively to those living in urban or suburban areas. Such users may not have access to off street overnight parking to which electrical power can be led to charge the vehicle's batteries. Consider for example an urban dweller who parks the vehicle on the public highway overnight. That user will not be in a position to plug the vehicle into mains electricity to recharge it. Nor will they wish to spend time driving the vehicle to some dedicated charging station and waiting while its batteries are charged. So the vehicle's batteries need to be capable of being charged in some other way. On a day to day basis the distance covered by this notional urban user may be moderate—say 30 km or less for a commute to and from work. But for maximum practicality it is desirable that the vehicle be capable of longer trips on occasion. And to satisfy the expectations of a driver used to an ICE powered alternative, the car needs to be capable of a certain degree of acceleration and of an acceptable top speed.

The present embodiment uses a system of removable, portable, battery units able to be removed from the vehicle by the user so that they can be carried away from the vehicle to be charged. Thus the urban user can for example remove a battery unit upon leaving the vehicle and take it into a flat or office to be recharged before the next journey. For the sake of convenience, the moderate range needed for, say, a short daily commute to work is to be provided by charging of a small battery, easily portable for the typical driver. For longer trips, a larger battery pack is used.

The requirement to achieve acceptable vehicle range and acceleration from a conveniently portable battery unit imposes stringent requirements in terms of efficiency of energy usage and peak power drawn. The problems in this respect, and the manner in which they are solved, are explained in the next section.

Power & Energy Considerations

There are three battery parameters that need to be taken into account. A given battery unit will have:
(a) an energy storage capacity, which limits vehicle range,
(b) a maximum peak power, which may be deliverable only for a brief period of time and which limits the vehicle acceleration that can be achieved using battery power alone, and
(c) a maximum continuous power—the highest power that can be provided over an extended period—which limits vehicle cruising speed.

These factors are linked to battery lifetime since for example operating a battery at a high continuous power may cause heat build-up and consequent damage. Likewise drawing high transient power from a battery may shorten its working life.

Problems relating to available energy and power can be alleviated by minimising vehicle mass. As will be explained below, the present embodiment is light in comparison to a typical road-going ICE powered motor car. Its unladen mass, without batteries, is approximately 450 kg. Allowing for a single 30 kg removable battery mass and a driver of 75 kg mass gives a typical operating mass of 555 kg.

Consider the peak power requirement. Assume that the vehicle is to be able to accelerate from 0-96 kmh$^{-1}$ (0-60 miles h$^{-1}$) in 10 seconds.

Modelling, taking account of aerodynamic drag and rolling resistance, shows that if the torque at the wheels can reach the dry traction limit of the tyres (about 335 Nm per driven wheel, in the present case), then the peak mechanical power required at the wheels for a vehicle having the stated operating mass is approximately 29 kW. Allowing for power losses in the electrics and drivetrain this equates to a power of approximately 37 kW at the battery.

Table 1 below gives figures for the performance available from known batteries of lithium iron phosphate (LiFePO4) and lithium manganese nickel (LiNiMnCoO2) types, for specified battery masses. It can be seen that even a small battery pack of 5 kg can provide the 7.5 kW power needed to sustain a tolerable cruise speed of 96 kmh$^{-1}$, but providing the power required for vehicle acceleration is problematic. Using LiFePO4 batteries to provide the 37 kW power requirement mentioned above implies a battery mass of 15 kg or above. Additionally batteries of LiFePO4 type have a lower energy density than LiNiMnCoO2 batteries, so there is a conflict between using a high power battery and using a high capacity battery.

TABLE 1

| Battery (kg) | LiFePO4 | | LiNiMnCoO2 | |
| --- | --- | --- | --- | --- |
| | Peak power (kW) | Continuous power (kW) | Peak power (kW) | Continuous power (kW) |
| 5 | 13 | 9 | 9 | 7.5 |
| 10 | 26 | 18 | 18 | 15 |
| 15 | 39 | 27 | 27 | 22.5 |
| 20 | 52 | 36 | 36 | 30 |
| 25 | 65 | 45 | 45 | 37.5 |
| 30 | 78 | 54 | 54 | 45 |

Even in the case of a 15 kg LiFePO4 battery or a 25 kg LiNiMnCoO2 battery, the power requirement during vehicle acceleration is close to the maximum peak power, which would result in reduced battery life (i.e. a reduced number of charge cycles before battery replacement) and large battery heat generation, increasing demand for battery cooling.

These problems are addressed, in accordance with the present invention, by use of a secondary energy store and power supply in the form of a mechanically coupled flywheel.

In a battery powered electric vehicle, provision of a mechanically flywheel system is in some respects a counterintuitive choice. A more conventional approach is to use a motor/generator both for propulsion (during acceleration or cruising) and for energy capture (during deceleration), with the recaptured energy being stored in the battery. In the context of a conventional electric vehicle with a large and heavy battery pack easily capable of supplying the peak power needed for vehicle acceleration, the motor/generator approach has very clear advantages given its relative mechanical simplicity and the weight penalty associated with a mechanical flywheel system.

But the present inventors have recognised that in the context of a lightweight vehicle which is required to be drivable by a removable, portable battery pack, use of a mechanical flywheel system allows the conflicting design requirements to be reconciled. By storing energy for release at times of high power requirement, in particular during vehicle acceleration, the flywheel system reduces the peak power required of the batteries. This makes it possible to use a portable-sized battery to power the vehicle. It also allows a reduction in the power of both the electric propulsion motor and its controller, with consequent economies in vehicle mass and cost.

The modelling referred to above suggested a peak power requirement of 29 kW at the driven vehicle wheels, based on a 555 kg operating mass for the vehicle, including a 30 kg battery pack. Consider now a vehicle provided with a small portable battery pack of just 5 kg mass. If a LiNiMnCoO2 battery is chosen for its superior storage capacity, that can provide 9 kW peak power. The lower vehicle mass results in a slightly lower peak power requirement of 27 kW at the wheels, for the stated acceleration. If 7 kW of mechanical power is supplied by the battery, 20 kW needs to be supplied by the flywheel system.

The energy that can be supplied by the flywheel during acceleration is equal to the kinetic energy of the vehicle prior to braking, minus the energy losses that occur as the energy is transmitted from the vehicle wheels to the flywheel and then back from the flywheel to the wheels that connects the flywheel and wheels. To achieve the required acceleration, charging the flywheel solely from the vehicle wheels, therefore requires a round trip energy regeneration efficiency of 20/27=74%, if one considers the vehicle first braking from 96 kph to a standstill and then accelerating back to 96 kmh$^{-1}$.

FIG. 1a represents the mechanical parts through which a flywheel 10 is coupled to driven vehicle wheels 12. The mechanical parts comprise the flywheel 10, a variator 14, a gearing 16, a step-up gearing 104, a differential gearing 18, and driveshafts 20. The gearing 16 can be used to couple the variator 14 to the differential gearing 18. The step-up gearing 104 can be used to couple the variator 14 to the flywheel 10. Energy is dissipated in the flywheel 10 itself, e.g. due to losses in its bearings, and windage loss, the variator 14, the gearing 16, the differential gearing 18, the step-up gearing 104, and in joints and wheel bearings associated with the driveshafts 20.

Regenerated energy makes a round trip through this system, being first transmitted from the vehicle wheels 12 to the flywheel 10, for temporary storage, and then transmitted from the flywheel 10 to the vehicle wheels 12, for usage. Round trip efficiency can be expressed as $$\eta_{RT} = (\eta_{flywheel} * \eta_{variator} * \eta_{gearing} * \eta_{differential} * \eta_{driveshaft})^2$$

and inserting realistic values for the efficiencies of the various units gives $$\eta_{RT} = (0.96*0.92*0.98*0.97*0.98)^2 = 0.68$$

That is, an overall round trip energy regeneration efficiency of 68%, based on a variator efficiency of 92%. This is not quite adequate to give 0-96 kmh$^{-1}$ in 10 s, but can provide a vehicle that reaches 96 kmh$^{-1}$ in 12 seconds, which is considered adequate when using such a small battery pack.

In the case of a 10 kg battery, allowing again for 68% round trip regenerative efficiency, a 0-96 kmh$^{-1}$ time of 7.8 s for 0-96 kmh$^{-1}$ can be provided, which compares favourably with the performance of a typical ICE powered small motor car.

Battery System

The present embodiment uses a modular battery system intended to provide ease of use and flexibility of operation.

Figure 2:
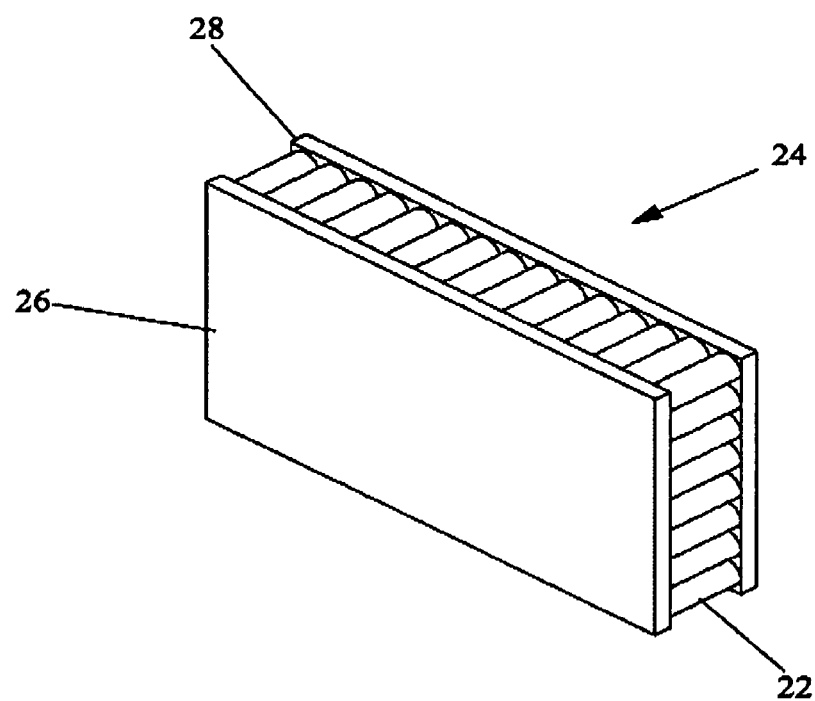
FIG. 2 represents a block of electrical cells for use in a battery unit for the same vehicle.

It is not intended to limit the scope of the invention by reference to any specific battery type, but the present embodiment uses commercially available lithium manganese nickel (LiNiMnCoO2) type cells. Suitable cells are commercially available. Individual cells are typically small in size. FIG. 2 shows a number of cells 22 assembled in a battery block 24 for use in a battery unit. The individual cells are small cylindrical items with contacts on their end faces in this example and are sandwiched between plates 26, 28 through which suitable electrical connections are made. In this example the battery block 24 contains some 120 cells and has a mass of approximately 5 kg.

The vehicle under discussion is configured to receive battery units of two different types by two different routes. It has a first port 43 for receiving a smaller battery unit 30 and a second port 45 (as shown in FIG. 5b) for receiving a larger battery unit 32. In the present embodiment both the first port 43 and the second port 45 are duplicated so that two of the smaller battery units 30 and two of the larger battery units 32 can be accommodated. In the present embodiment the first port 43 is accessed from within the vehicle cabin 41 (as shown in FIG. 6b), so the driver can carry the smaller battery unit 30 into the cabin and plug it in once seated in the vehicle. The second battery port 45 is accessible from the vehicle's exterior, and the second battery unit 32 is receivable by the vehicle in a position behind vehicle seating 49 (as shown in FIG. 6b), as will be explained below.

The battery units 30, 32 are both removably mountable to the vehicle. That is to say that the driver can quickly disconnect the units from the vehicle, both electrically and mechanically, without need of any tools or other equipment. Of course motor vehicles and their ancillaries can generally be disassembled given sufficient time and suitable tools, but that is not to say that the components in question are "removable" in the sense that term is used here. The operation of removing the battery units 30, 32 is sufficiently straightforward and convenient to be carried out solely manually and on a daily basis. Preferably mechanical release of one of the battery units 30, 32 requires only one or only two manual operations, such as depression of a release button or actuation of an electrical switching device.

Figure 3A:
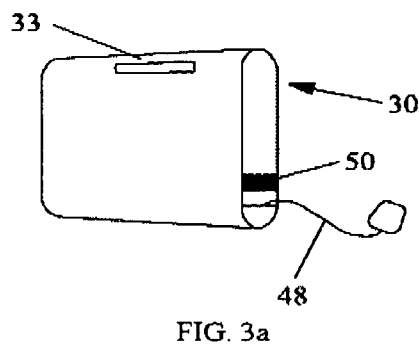
FIGS. 3a and 3b represent a small portable battery unit for use in the same vehicle, viewed from opposite ends in the two drawings.
Figure 3B:
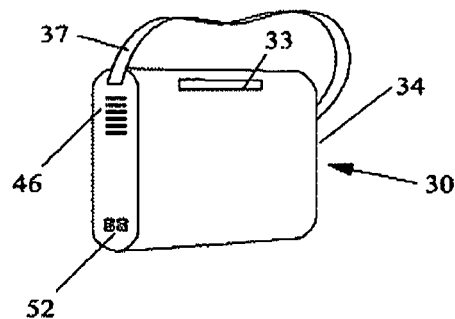
Figure 3C:
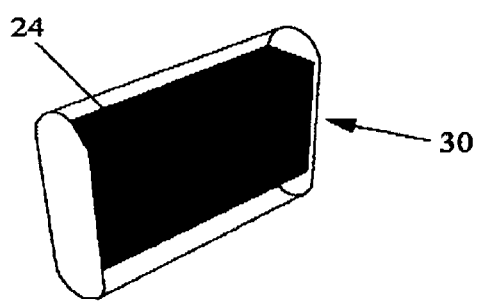
FIG. 3c represents inner parts of the small portable battery unit, an outer casing being omitted.

Referring to FIG. 3a-3c, the smaller battery unit 30 is intended to be carried to and from the vehicle by the driver using a handle 33 (some other means such as a shoulder strap 37 or perhaps a back harness could be provided additionally or alternatively). The mass of the smaller battery unit 30 is small enough that a typical driver will be easily able to carry it without discomfort, making the smaller battery unit 30 truly portable without need for example of castor wheels. In the present embodiment, the smaller battery unit 30 carries a single 5 kg battery block 24 of cells (see FIG. 3c), housed in an outer casing 34 similar in size and shape to a small attache case or laptop bag. The vehicle has in the present example a pair of first ports 43 (as shown in FIG. 6b) arranged mid-console to receive and electrically connect to one or two such smaller battery units 30. The outer casing 34 is in this embodiment provided with a visual battery status indicator 46 for displaying the state of charge of the battery. This takes the form of a set of light emitters, the number of these emitters which are illuminated representing the state of charge. The battery status indicator 46 is active only at certain times, e.g. whilst charging, upon first connection to the vehicle, and when a capacitive sensor in the handle 33 detects that the handle 33 is being touched. A power lead 48 carries an electric connector such as a plug to connect the unit to a mains supply for charging and is retractable by a spring (not shown) when not in use. A movable cover 50 closes a cavity containing the power lead 48 and plug when they are not in use. USB ports 52 or some other type of data interface (which could be a wireless interface) can be used to interrogate the battery unit 30.

These USB ports 52 also allow the battery to be used as an energy source for powering or charging other devices (such as a mobile phone) when the battery is in or outside the vehicle.

Figure 4A:
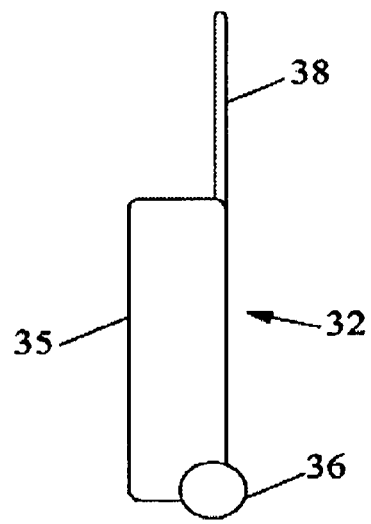
FIGS. 4a and 4b represent a large battery unit for use in the same vehicle, an outer casing of the unit being seen in FIG. 4a and FIG. 4b showing various possible battery configurations within the outer casing.
Figure 4B:
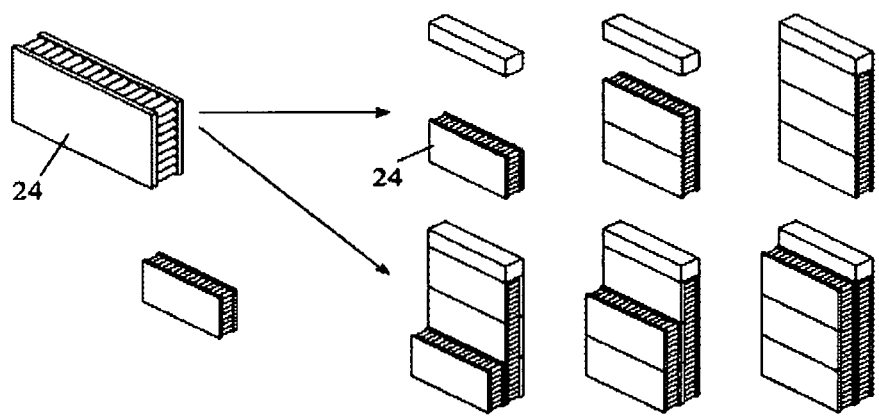

Turning to FIG. 4, the larger battery unit 32 in this example can have a mass between approximately 5 kg and 30 kg, depending on the number of battery blocks 24 of cells housed in a standard sized outer casing 35. In this way the driver/owner can choose a battery option flexibly to match his/her requirements for vehicle range/battery mass. This may be specified upon purchase. It may be modifiable by the driver after purchase by inserting/removing battery blocks 24. The casing 35 is in this example provided with wheels 36, so that it can be trundled to and from the vehicle, avoiding the necessity for the driver to carry its whole weight. A telescopic handle 38 facilitates this, and the battery unit 32 is in these respects configured similarly to a wheeled suitcase. The casing 35 houses one or more battery blocks 24 of electrical cells. In the present embodiment it is able to carry from one to six blocks 24. Suitable configurations of cell battery blocks 24 within the casing 35 are represented in FIG. 4b. The motor car is configured to receive up to two of the larger battery units 32.

Figure 5A:
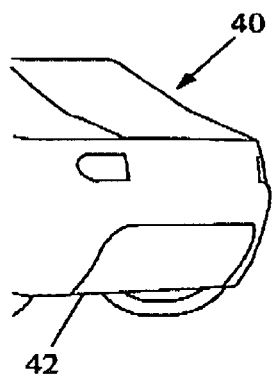
FIG. 5a represents the rear of a motor car embodying the present invention.
Figure 5B:
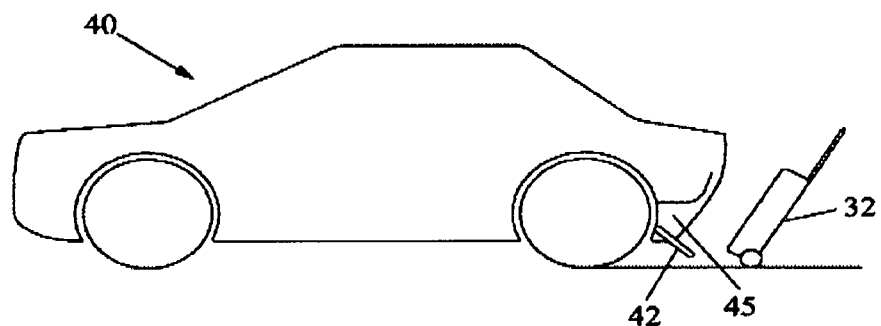
FIGS. 5b and 5c both represent the vehicle as a whole, viewed from one side.
Figure 5C:
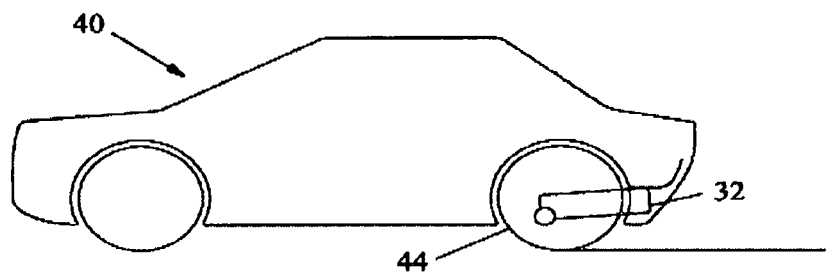

The vehicle 40 is seen in FIG. 5a to have at its rear a low level battery hatch 42 able to be opened to admit the larger battery unit(s) 32. Two of the battery units 32 can be accommodated side-by-side. The battery hatch 42 gives access to a chute into which the larger battery unit 32 slides, and can be hinged to the vehicle at its lower edge so that when open it forms a ramp at or just above ground level up which the battery unit 32 can be moved to facilitate its insertion—see FIG. 5b. The battery hatch 42 may be configured to be opened electrically in response for example to a radio frequency signal from a fob held by the driver or from the battery unit 32 itself. The larger battery unit 32 is housed in use in a lower, rear part of the motor car 40 as seen in FIG. 5c. In the illustrated example, which is front wheel drive, this location is between the rear, ground-engaging wheels 44.

The vehicle 40 may also be provided with a range extending fixed battery pack not configured for frequent removal, chargeable through an electrical connection led to the car 40. All of the removable battery packs are also able to be charged in this manner—see FIG. 6b.

The modular formation of the battery units 30, 32 gives various commercial and technical options. For example a customer may specify the number and mass of the battery packs supplied, according to the range required and the weight the customer is prepared to move. Battery units 30, 32 may be opened for replacement of the electrical cells, or to upgrade battery capacity, or to remove cells and reduce weight.

The provision of both (a) a first port 43 for a small easily portable battery unit 30 and (b) a second port 45 for a larger battery unit 32 also gives various options. By virtue of other features of the vehicle 40, including its light weight and its mechanical flywheel system, the smaller battery unit 30 is able to give a range adequate for most short trips. Thus for example a commuter with a short daily trip to and from work may make it his/her daily practice to remove only the smaller battery unit 30 and to carry that to a house or flat and/or to the office for charging. It may be arranged that a daily surplus of charge in that unit is used to charge a larger battery unit 32 in the vehicle so that greater range is available when needed. Additionally or alternatively the same user may choose to charge and load one or more of the larger battery units 32 only when necessary, e.g. because a longer journey is to be made. The fixed weight penalty of a large battery pack associated with many electric vehicles is thus avoided. This can improve both performance (acceleration) and energy economy.

Figure 6A:
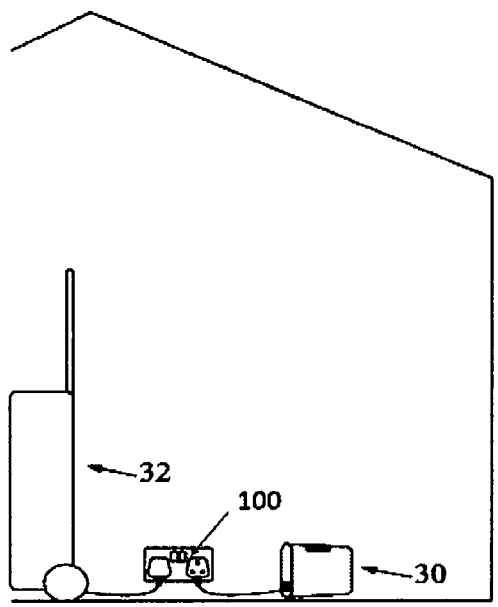
FIG. 6a is a schematic diagram of the large battery unit showing how it can be charged indoors, independent from the vehicle.
Figure 6B:
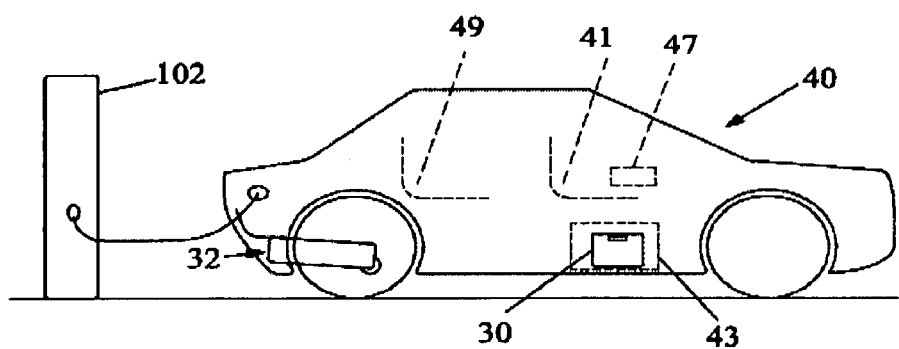
FIG. 6b is a schematic diagram of the large battery unit showing how it can be charged from an electric vehicle charging post when mounted in the vehicle.

Referring to FIG. 6a, battery units 30, 32 are able to be charged by plugging into a conventional mains electrical socket 100, either directly or via a suitable charger. In addition, battery units 30, 32 are able to be charged through the vehicle 40 by means of a normal electric vehicle charging post 102, as illustrated in FIG. 6b.

Operating Modes

The power that can be provided may vary according to the driver's choice of battery options. In the present embodiment on-board electronic control device 47 (as shown in FIG. 6b) serve to limit power drawn from the batteries 30, 32 variably in dependence on the on-board battery capacity. This may be by implementing two or more different operating modes depending on the on-board battery capacity detected. Either or both of peak power and continuous power may be limited.

In the present embodiment the vehicle has two operating modes:

(1) city mode, which is active when only a single 5 kg battery is loaded and adequately charged. In the present example this provides the driver with a maximum speed of approximately 96 kmh−1 and with acceleration from 0-96 kmh−1 in 12 s;

(2) normal mode, which is active when two or more battery packs are loaded and adequately charged, and gives a maximum speed of approximately 128 kmh$^{-1}$ and acceleration from 0-96 kmh$^{-1}$ in 10 s or less.

Flywheel and Powertrain

Power is exchanged between the driven vehicle wheels 12 and the flywheel 10 via at least one variator 14. The present embodiment comprises a single variator through which power is able to flow through in either direction The flywheel 10 is a metal item in the present embodiment. More specifically it is machined from steel, which is economical. A different construction could however be adopted, such as a composite flywheel. Carbon fibre reinforced plastics would be suitable if cost considerations permit.

In the powertrain depicted in FIG. 1a power supplied by the battery unit(s) 30, 32 is converted to rotary mechanical form by electric motor 62 to drive the vehicle. In detail, the drivetrain 70 comprises the gearing 16, a decoupling clutch 64, the differential gear 18, and the driveshafts 20. Motor shaft 60 is coupled through the gearing 16 to one side of the decoupling clutch 64, the other side of which is coupled to the differential gear 18 and so, through the driveshafts 20, to the vehicle wheels 12.

The gearing 16 has in this example a first pinion 16a driven by the motor shaft 60 and meshing with a larger main gear 16b to provide a speed reduction in the direction from the motor shaft 60 to the decoupling clutch 64. A second pinion 16c also meshes with the main gear 16b. Therein, the electric motor 62 is coupled to the first pinion 16a through the motor shaft 60. The first pinion 16a is meshed with the larger main gear 16. The larger main gear 16b is coupled to the decoupling clutch 64. The decoupling clutch 64 is coupled to one side of the differential gear 18. The other side of the differential gear 18 is coupled to one of the driveshafts 20. Therefore, the power provided by the battery units 30, 32 can be transmitted from the electric motor 62 to at least one of the vehicle wheels 12. Therein, the decoupling clutch 64 is used for selectively decoupling the flywheel 10 from the vehicle wheel(s) 12 to enable the flywheel 10 to be driven from the electric motor 62 while the vehicle is stationary, so that the flywheel 10 is able to be charged with energy before the vehicle is driven.

In this example, the mechanical flywheel system comprises a mechanical rotary transmission 80 (as shown in FIG. 1a) and a flywheel 10. The mechanical rotary transmission 80 is configured and controllable to transmit power from the at least one of the vehicle wheels 12 to the flywheel 10; and to transmit power from the flywheel 10 to the at least one of the vehicle wheels 12, enabling power from the electric motor 62 and the flywheel 10 to be used concurrently to accelerate the vehicle, and enabling vehicle kinetic energy to be recovered and stored at the flywheel 10 during vehicle deceleration. In detail, the mechanical rotary transmission 80 comprises the variator 14. The variator 14 is operatively coupled to a motor shaft 60 of the electric motor 62, which is operatively coupled to the at least one of the vehicle wheels 12 through the drivetrain 70. The mechanical rotary transmission 80 further comprises the step-up gearing 104 and the friction clutch 106. The second pinion 16c is coupled to a rotary output 14a of the variator 14. The variator's 14 input 14b is coupled via step-up gearing 104 to a friction clutch 106 which, when engaged, serves to operatively couple the variator input 14b to the flywheel 10. The step-up gearing 104 provides the high rotary speed required at the flywheel 10. The friction clutch 106 is controllable to disengage the flywheel from the vehicle wheels 12 when they are static and, by slipping, to smooth transitions when the flywheel is re-engaged.

The designations "output" and "input" in relation to the rotary parts of the variator 14 are convenient but arbitrary since power can flow through the variator 14 in either direction—from input to output or vice versa.

The decoupling clutch 64 serves—when disengaged—to decouple the motor shaft 60 and the flywheel 10 from the vehicle wheels 12. This allows the electric motor 62 to be run while the vehicle is stationary so that the electric motor 62 can be used to drive the flywheel 10 through the gearing 16, the variator 14 and the friction clutch 106, to charge the flywheel 10 with energy while the vehicle is at a standstill and so ensure that the flywheel 10 will be ready to provide power when it is demanded by the driver. For example, when the driver first gets into the vehicle and activates it, the decoupling clutch 64 can be disengaged and the electric motor 62 used to give the flywheel 10 an initial charge of energy. When the driver gives control inputs to cause the vehicle to move off, the decoupling clutch 64 is engaged and the charged flywheel 10 is available to provide power to accelerate the vehicle. The friction clutch 106 is progressively engaged and the variator 14 suitably controlled to provide a desired time profile of the resultant wheel torque, avoiding excessive jerk. When necessary during subsequent operation the electric motor 62 can again be used to charge the flywheel 10 independently of the vehicle wheels. The decoupling clutch 64 is in this example a dog clutch but it could take other forms.

Figure 1B:
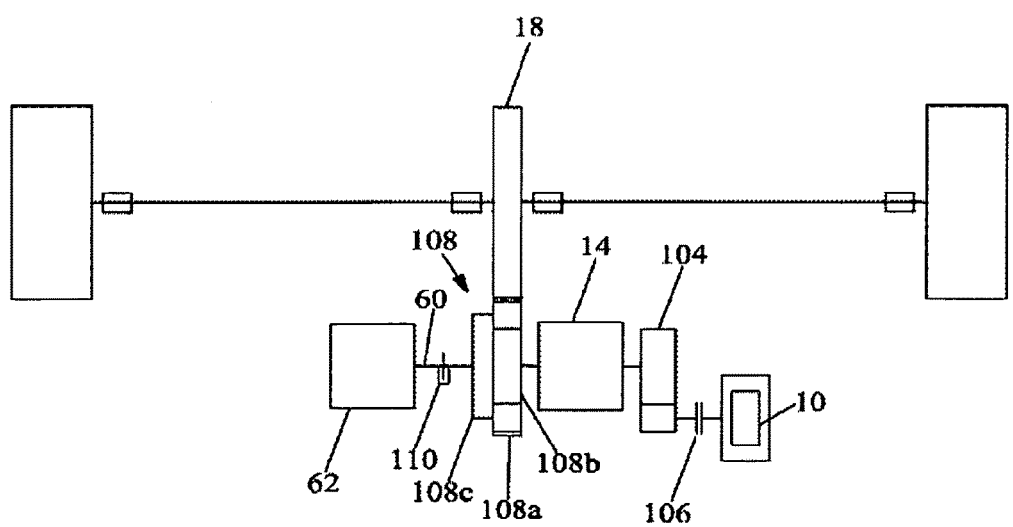

In an alternative drivetrain arrangement, shown in FIG. 1b, the dog clutch 64 is replaced with a planetary gear train 108 which serves as a power split device. Therein, the power split device is used for selectively decoupling the flywheel 10 from the vehicle wheel(s) 12 to enable the flywheel 10 to be driven from the electric motor 62 while the vehicle is stationary, so that the flywheel 10 is able to be charged with energy prior to before the vehicle is driven. The planetary gear train 108 has a ring gear 108a which meshes with the differential gear 18; a sun gear 108*b* coupled to the input of the variator 14; and a planet carrier 108*c* coupled to the motor shaft 60.

Alternative embodiments, in which either the sun gear 108*b* or planet carrier gear 108*c* meshes with the differential 18, are also possible. When the vehicle is stationary, the electric motor 62 is connected to the variator 14, allowing the flywheel 10 to be charged. During vehicle deceleration, the motor shaft 60 is fixed by the action of a friction brake 110. Power thus flows from the vehicle wheels 12 to the flywheel 10, via the variator 14, step-up gearing 104 and friction clutch 106, bypassing the electric motor 62. The electric motor 62 can be used as an electromagnetic brake to reduce the torque requirement of the friction brake 110.

In the present embodiment the variator 14 is of belt and sheave type. Suitable variators are known to the skilled person. However other suitable types of variator could be adopted in other embodiments.

The Vehicle

The mass of the present vehicle is small in comparison to that of a conventional ICE powered automobile. Several factors contribute to this. Because of the flexibility provided by the modular system of removable and interchangeable batteries, the vehicle is not reliant on provision of a large fixed battery capacity. Onboard battery mass can be as low as 5 kg. The low vehicle mass and the use of the flywheel system to supplement motor power during acceleration mean that the power capacity of the electric motor 62 and motor controller can be modest and the mass of these components is thus minimised, and is far lower than the mass of an ICE used in a more conventional motor car. The weight penalty of the flywheel system is modest.

The vehicle is a steerable motor vehicle. It has four wheels 12 which engage the ground and on which the vehicle runs. The present embodiment is a road-going vehicle.

The structure of the vehicle is also lightweight. The present embodiment uses a space frame chassis for strength with low mass. Larger battery packs 32 are accommodated behind the seats for the driver and a single passenger. Other embodiments may have a different number of seats, e.g. four seats.

The embodiments shown and described above are only examples. Many details are often found in the art such as the features of sub-screen distribution controlling method and device using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electric vehicle having multiple vehicle wheels and comprising an electric motor;
   a drivetrain for transmitting rotary power from the electric motor to at least one of the vehicle wheels;
   a flywheel;
   a mechanical rotary transmission which is configured and controllable
   to transmit power from the at least one of the vehicle wheels to the flywheel and
   to transmit power from the flywheel to the at least one of the vehicle wheels, enabling power from the electric motor and the flywheel to be used concurrently to accelerate the vehicle, and enabling vehicle kinetic energy to be recovered and stored at the flywheel during vehicle deceleration; and
   at least one battery unit which is engageable with the vehicle to supply electric power to the electric motor for vehicle propulsion, the battery unit being removable from the vehicle.

2. The vehicle of claim 1, wherein, a mass of the battery unit is 30 kg or less.

3. The vehicle of claim 1, wherein, a mass of the battery unit is 10 kg or less.

4. The vehicle of claim 1, wherein, a mass of the battery unit is 6 kg or less.

5. The vehicle of claim 1, wherein, the vehicle is drivable solely using power derived from the at least one battery unit.

6. The vehicle of claim 1, wherein, the battery unit is provided with a carrying handle or a shoulder strap.

7. The vehicle of claim 1, wherein, the at least one battery unit comprises a first battery unit, and the vehicle comprises a first port for receiving the first battery unit which is accessible from inside of a vehicle cabin.

8. The vehicle of claim 7, wherein, the at least one battery unit comprises a second battery unit, the vehicle comprises a second port for receiving the second battery unit, and the second port being accessible from outside the vehicle cabin.

9. The vehicle of claim 8, wherein, the second port is accessible from rear of the vehicle and the second battery unit is receivable by the vehicle in a position behind vehicle seating.

10. The vehicle of claim 1, wherein, the vehicle is configured to receive at least two different sizes of battery unit, comprising a larger battery unit and a smaller battery unit.

11. The vehicle of claim 10, wherein, the vehicle further comprises an electronic control device configured to control power supplied to the electric motor, and the electronic control device is configured to implement at least two different power control strategies according to which size of battery unit is installed.

12. The vehicle of claim 1, wherein the vehicle has an unladen mass, inclusive of the battery unit, of 1200 kg or less.

13. The vehicle of claim 1, wherein the vehicle has an unladen mass, inclusive of the battery unit, of 600 kg or less.

14. The vehicle of claim 1, wherein, the mechanical rotary transmission comprises a decoupling clutch or a power split device for selectively decoupling the flywheel from the vehicle wheel(s) to enable the flywheel to be driven from the electric motor while the vehicle is stationary, so that the flywheel is able to be charged with energy before the vehicle is driven.

15. The vehicle of claim 1, wherein, the mechanical rotary transmission comprises a variator.

16. The vehicle of claim 15, wherein, the variator is operatively coupled to a motor shaft of the electric motor, which is operatively coupled to the at least one of the vehicle wheels through the drivetrain.

17. A powertrain for an electric vehicle having multiple vehicle wheels, the powertrain comprising:
   an electric motor;
   a drivetrain for transmitting rotary power from the electric motor to at least one of the vehicle wheels;

a flywheel;
a mechanical rotary transmission which is configured and controllable to
    transmit power from the at least one of the vehicle wheels to the flywheel; and
    transmit power from the flywheel to the at least one of the vehicle wheels, enabling power from the electric motor and the flywheel to be used concurrently to accelerate the vehicle, and enabling vehicle kinetic energy to be recovered and stored at the flywheel during vehicle deceleration; and
at least one battery unit which is engageable with the vehicle to supply electric power to the electric motor for vehicle propulsion, the battery unit being configured to be removable from the vehicle.

* * * * *